US012189354B2

(12) United States Patent
Rangarajan et al.

(10) Patent No.: US 12,189,354 B2
(45) Date of Patent: Jan. 7, 2025

(54) AUTONOMOUS MONITORING AND CONTROL FOR OIL AND GAS FIELDS

(71) Applicant: Landmark Graphics Corporation, Houston, TX (US)

(72) Inventors: Keshava Rangarajan, Sugar Land, TX (US); Shashi Dande, Spring, TX (US); Rohan Lewis, Middleton, MA (US); Siddhartha Kazuma Rangarajan, Sugar Land, TX (US); Aditya Chemudupaty, Pearland, TX (US)

(73) Assignee: Landmark Graphics Corporation, Houston, TX (US)

( * ) Notice: Subject to any disclaimer, the term of this patent is extended or adjusted under 35 U.S.C. 154(b) by 423 days.

(21) Appl. No.: 17/619,341

(22) PCT Filed: Mar. 16, 2020

(86) PCT No.: PCT/US2020/022940
§ 371 (c)(1),
(2) Date: Dec. 15, 2021

(87) PCT Pub. No.: WO2021/040795
PCT Pub. Date: Mar. 4, 2021

(65) Prior Publication Data
US 2022/0236707 A1    Jul. 28, 2022

Related U.S. Application Data

(60) Provisional application No. 62/893,380, filed on Aug. 29, 2019.

(51) Int. Cl.
*G05B 19/042*    (2006.01)
(52) U.S. Cl.
CPC .. *G05B 19/042* (2013.01); *G05B 2219/40573* (2013.01)

(58) Field of Classification Search
CPC .................................................. G05B 19/042
(Continued)

(56) References Cited

U.S. PATENT DOCUMENTS

2013/0085715 A1    4/2013   Lakshminarayan et al.
2015/0356482 A1*  12/2015   Whipple ............... G06Q 50/06
                                                          705/7.23
(Continued)

FOREIGN PATENT DOCUMENTS

WO       2015073687       5/2015

OTHER PUBLICATIONS

Zhong, Zhi, et al. "A deep learning approach to anomaly detection in geological carbon sequestration sites using pressure measurements." Journal of hydrology 573 (2019): 885-894. (Year: 2019).*
(Continued)

*Primary Examiner* — Mohammad Ali
*Assistant Examiner* — Joshua T Sanders
(74) *Attorney, Agent, or Firm* — Kilpatrick Townsend & Stockton LLP

(57) ABSTRACT

A system for autonomous operation and management of oil and gas fields includes at least one autonomous vehicle. The system also includes a processor communicatively couplable to the plurality of autonomous vehicles and a non-transitory memory device including instructions that are executable by the processor to cause the processor to perform operations. The operations include receiving field analytics data of an oil and gas field and producing at least one hydrocarbon field model based on the field analytics data. Additionally, the operations include deploying the at least one hydrocarbon field model to a sensor trap appliance using the at least one autonomous vehicles and collecting well sensor data from the sensor trap appliance. Further, the operations include detecting an anomaly using the at least (Continued)

one hydrocarbon field model and the well sensor data and triggering an operational process based on detecting the anomaly.

20 Claims, 10 Drawing Sheets

(58) Field of Classification Search
USPC .......................................................... 700/28
See application file for complete search history.

(56) References Cited

U.S. PATENT DOCUMENTS

| 2017/0089502 A1* | 3/2017 | Genta .................... B66F 7/065 |
| 2017/0258005 A1 | 9/2017 | Cutter | |
| 2018/0066503 A1* | 3/2018 | Vittal .................... F04D 13/10 |
| 2018/0092004 A1 | 3/2018 | Garre | |
| 2018/0095004 A1 | 4/2018 | Ide et al. | |
| 2019/0278988 A1* | 9/2019 | Papanikolopoulos ...................... G06F 18/23213 |
| 2020/0232963 A1* | 7/2020 | Zelinski ................ G01J 3/2823 |

OTHER PUBLICATIONS

Lu, "Event-Driven Orchestration: Effective Microservices Integration Using BPMN and AMQP", Microservices Zone, downloaded from the internet at https://dzone.com/articles/event-driven-orchestration-an-effective-microservi, Jul. 4, 2018, 8 pages.
Mozzie, The Mozzie Medical Express Quadplane, 2018, 6 pages.
International Application No. PCT/US2020/022940, International Search Report and Written Opinion, mailed on Jul. 9, 2020.
Norway Application No. 20211580, Office Action mailed Apr. 11, 2024, 6 pages.
Woodside Energy, "Creating the Intelligent Asset: Fusing IoT, Robotics, and Artificial Intelligence (Youtube video)," available online at https://youtu.be/FDLQYGw0aSU?si=9zfPa6D9qPg2AtZ, published Jun. 13, 2019, 1 page (website screenshot submitted).

* cited by examiner

AUTONOMOUS MONITORING AND CONTROL FOR OIL AND GAS FIELDS

CROSS-REFERENCE TO RELATED APPLICATION

This claims the benefit of and priority to U.S. Provisional Application Ser. No. 62/893,380, filed Aug. 29, 2019 and titled "AUTONOMOUS MONITORING AND CONTROL FOR OIL AND GAS FIELDS," the entire contents of which are hereby incorporated by this reference.

TECHNICAL FIELD

The present disclosure relates generally to systems and methods for autonomous operation and management of oil and gas fields. More specifically, but not by way of limitation, this disclosure relates to end-to-end, distributed-systems and methods for autonomous surveillance and operation of oil and gas fields using a fleet of autonomous vehicles.

BACKGROUND

Oilfield facilities and assets are typically a significant distance apart. Further, the facilities and assets are often only partially integrated into automation systems and often not equipped for data communication across a communication network. Due to the physical separation and a lack of system connection, operational visibility, data storage, and data analysis is limited. For example, the physical separation and the lack of system connection may require on-site visits by an operator to many different wells to collect information about the wells.

DETAILED DESCRIPTION

Figure 1:
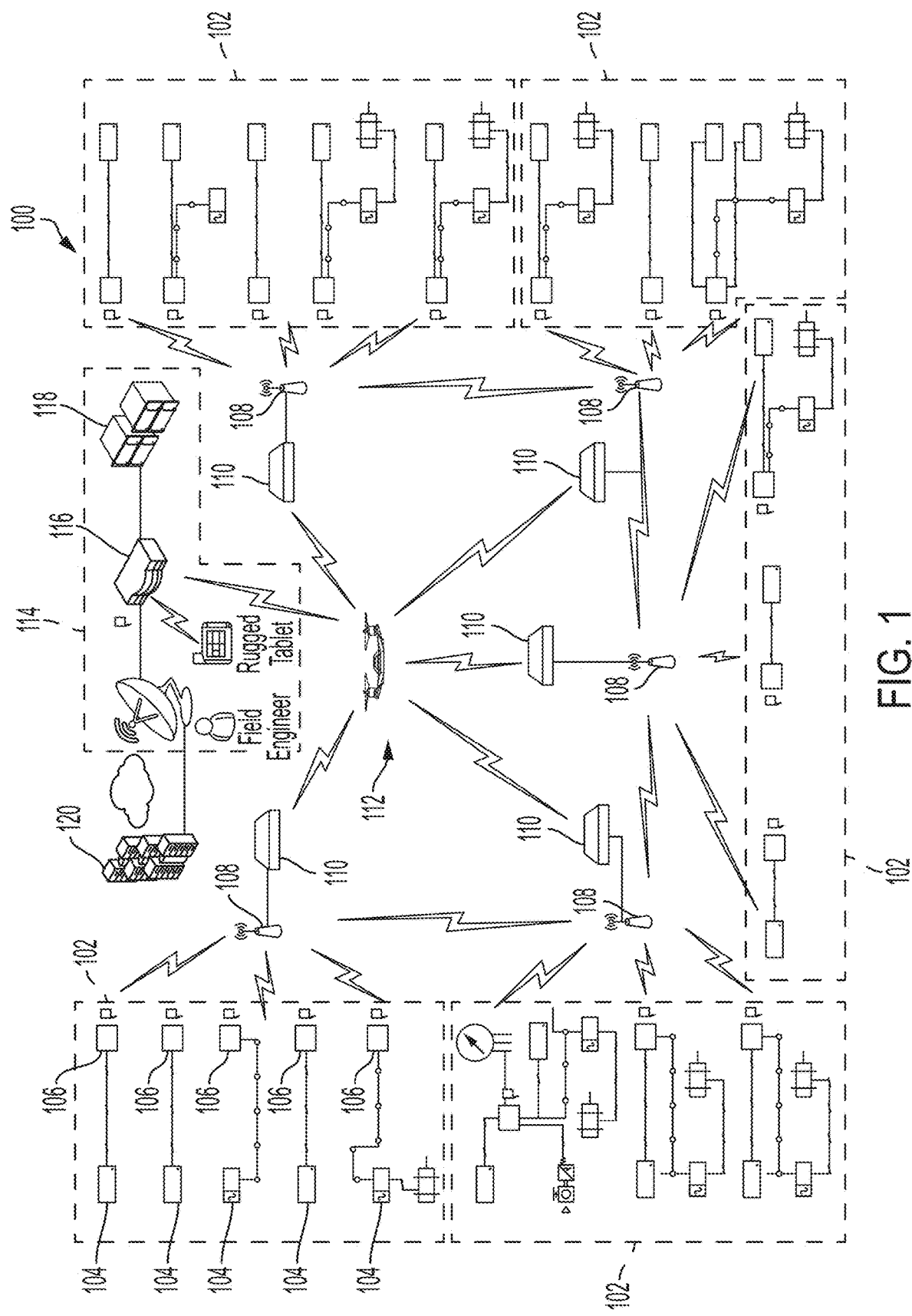
FIG. 1 is a schematic view of an oil and gas field incorporating an autonomous surveillance and operation system according to some examples of the present disclosure.

Certain aspects and features relate to a system that improves, and makes more efficient, the autonomous operation and management of oil and gas fields. Certain aspects and features relate to an end-to-end, distributed systems and methods for cloud-native, edge-inclusive, intelligent, predictive, autonomous surveillance and operation of oil and gas fields utilizing a fleet of autonomous vehicles. In some examples, the fleet of autonomous vehicles may include unmanned aerial vehicles (UAVs) and unmanned ground vehicles (UGVs).

Aspects and features can include using existing sensors and existing field automation systems as inputs of edge data analytics to reduce hardware costs due to new equipment purchases. One or more edge computing devices may perform Artificial Intelligence (AI) powered projection and optimization as well as soft sensing on data generated from the existing sensors, predict potential adverse well situations (e.g., equipment related or production related), and, from the projections, can trigger alerts and online optimization of production or product delivery and scheduling of maintenance parts delivery and operations. Performing these calculations at the edge may enable rapid operation on the well. For further processing and field analytics, the collected information may be provided to a central system.

In some examples, a system includes autonomous vehicles with one or more processors communicatively coupled to the autonomous vehicles. A non-transitory memory device may include instructions that are executable by the processor to cause the processor to perform operations. The operations can include receiving field analytics data from a data lake, producing at least one hydrocarbon field model based on the field analytics data, deploying the at least one hydrocarbon field model to an intelligent sensor trap using at least one of the plurality of autonomous vehicles, and collecting sensor data from the intelligent sensor trap. The operations can further include detecting an anomaly using the at least one hydrocarbon field model and the sensor data, and triggering an operational process based on detecting the anomaly. The autonomous vehicles can include rovers (e.g., UGVs), aircraft (e.g., UAVs), or a combination of rovers and aircraft. The operational process can include, as examples, maintenance operations, product delivery operations, or production optimization processes.

In an example, the system makes use of fleets of UAVs and UGVs that are pre-connected to intelligent sensor traps associated with wells in an oil and gas field and data vans. The UAVs, UGVs, data vans, and sensor traps may form interconnected peer-to-peer networks. The UAVs, UGVs, sensor traps, and data vans may run peer-to-peer data collection engines. AI model-driven anomaly detection algorithms may also be run by one or more of the UAVs, UGVs, sensor traps, and data vans that enable automated, autonomous surveillance and delivery of maintenance to oil and gas fields.

The system may also include built-in integration with business process management (BPM) engines that execute defined maintenance processes as well as production enhancement processes. The execution of these processes are based on the output of deep-learning-based (i.e., AI-based) anomaly detection engines. The anomalies detected may be equipment anomalies, low production wells, abnormal operational conditions, etc. The BPM engine may incorporate AI based detection, prediction, and optimization components to implement business processes triggered by these anomaly detection engines. The AI-based detection, prediction, and optimization components may compute diagnostic metrics about inflight processes. The system may provide voice-driven, user-interface based web applications. The applications may use natural language processing (NLP) and deep learning to assist engineering reviews and ask questions about specific situations. The system can also provide intelligent choices for actions based on knowledge extracted from an unstructured data source to steer online decision making of inflight field processes The system may operate in fields with little to no network connectivity. The system may facilitate rapid transfer of models and data to and from fields where the terrain is too spread out or hazardous for human workers. Additionally, the system may enable automation and optimization of production and maintenance processes to allow for faster rates of data and algorithm transfer as well as providing analytics and decision making at low costs.

The system may be applied to many use cases in oil and gas production, but for purposes of some examples, use of the system in stripper wells is described. A stripper well, also called a marginal well, may be an oil or natural gas well that is nearing the end of the well's economically useful life. These wells can continue to produce small volumes of oil or gas for long periods of time. Several production levels may be used to define a stripper well. The Interstate Oil and Gas Compact Commission defines a stripper well as one that produces 10 barrels per day (b/d) or less of oil or 60,000 cubic feet per day or less of natural gas during a 12-month period. For tax purposes, the United States Internal Revenue Service (IRS) uses 15 b/d or less of oil or 90,000 cubic feet per day or less of natural gas over a calendar year. Approximately 53% of stripper wells are without telecommunication capabilities. Aspects and features of this disclosure can reduce the maintenance cost of stripper wells through the elimination of manual processes, reduction of maintenance personnel, implementation of standardization, and implementation of continual monitoring. The system in at least some examples learns from data collected, which not only leads to reduction of maintenance cost, but also aids in enhancing oil recovery from these wells.

As the oil and gas industry experiences production decline from mature assets, cost pressures on mature assets may demand enhanced efficiency. In some cases, a thousand or more of these mature wells can be spread out over 2400 or more square kilometers. Many of the mature wells may not be connected to a communication network and require monitoring through on-site visits. A system according to the disclosed examples can provide an operator of such wells with: connectivity to those wells without connectivity; identification of potential production losses and part failures early using AI algorithms; minimization of well interventions or workovers; projection of potential part failures or anomalous part operation; scheduling of automated parts delivery and maintenance personnel to further improve maintenance optimization; and relief of field personnel from arduous, repetitive, and hazardous tasks.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a schematic view of an oil and gas field 100 incorporating an autonomous surveillance and operation system according to some examples of the present disclosure. The oil and gas field 100 may include a plurality of wells 102 that are able to produce oil, natural gas, or both from a subterranean formation. In some examples, the wells 102 are stripper wells. Stripper wells, also called a marginal wells, may be oil or natural gas wells that are nearing an end of the well's economically useful life. These wells 102 can continue to produce small volumes of oil or gas for long periods of time. The autonomous surveillance and operation system depicted in FIG. 1 can reduce the maintenance cost of stripper wells through the elimination of manual processes, reduction of maintenance personnel, implementation of standardization, and implementation of continual monitoring. The system in at least some examples learns from data collected, which may lead to reduction of maintenance cost and aid in enhancing oil recovery from the wells 102.

At each of the wells 102, well sensors 104 may be coupled to long-range, radio-based transceivers 106. The transceivers 106 may receive sensory data from the well sensors 104 and wirelessly transmit the sensory data to long-range wireless gateways 108. A sensor network may rely on the wireless gateways 108 as a bridge between specific radio frequency protocols and the Internet. In examples where the well sensors 104 support an IP stack, the wireless gateways 108 may forward packets generated at the well sensors 104 to a sensor trap appliance 110. For the well sensors 104 that do not support an IP stack, some form of routing and processing may be accomplished at the wireless gateways 108 before messages can be delivered to the sensor trap appliance 110. In some examples, the transceivers 106 (e.g., communication nodes) broadcast data messages over a long range (LoRa) radio protocol to the wireless gateway 108. The messages may be received by one or more of the wireless gateways 108 depending on the proximity of a particular transceiver 106 to the wireless gateways 108. The wireless gateways 108 may forward the radio transmissions to the sensor trap appliances 110. The sensor trap appliances 110 may be positioned between the wireless gateways 108 and an edge computing system that runs artificial intelligence or machine learning algorithms (e.g., a data van or edge computer 118). In an example, as depicted in FIG. 1, each of the wireless gateways 108 of the oil and gas field 100 may be assigned to a sensor trap appliance 110. The sensor trap appliances 110 may aggregate the sensor data and process and run analytics at the source.

In some examples, the wireless gateways 108 (e.g., LoRa wireless gateways) along with the sensor trap appliance 110 (e.g., a modified Raspberry Pi device) with cellular connectivity may provide connectivity over sub-gigahertz radio frequency bands (e.g., 868 MHz in Europe and 915 MHz in North America). The sensor trap appliance 110 may be based on LoRa technology and operate as a LoRaWAN gateway with a 4G/LTE backhaul. Data storage for data aggregation can be integrated with the sensor trap appliance 110. In an example, a multi-channel concentrator with a heatsink sponge, may enable multi-node communication with the sensor trap appliance 110. With cellular connectivity, Wi-Fi or ethernet cable may be avoided when controlling and managing data and the wireless gateways 108 from miles away. In one example, the 4G/LTE backhaul of the sensor trap appliance 110 may be used to communicate with drones 112 for secure peer-to-peer (P2P) data transfer between the sensor trap appliance 110 and the drones 112. In an example, the drones 112 may be any unmanned aerial vehicles (UAVs), unmanned ground vehicles (UGVs), or a combination thereof.

The drones 112 may collect the data stored at the sensor trap appliances 110 spread across the oil and gas field 100, and return to a data processing center 114. The data processing center 114 may include a router 116 that is able to forward data packets between computer networks. For example, the router 116 may forward the data collected by the drones 112 to the data van or edge computer 118. The data van or edge computer 118 may gather data from each of the wells 102 and make decisions associated with the wells 102 by receiving the data from the drones 112 that was collected by the drones 112 while on location in the oil and gas field 100 (e.g., via cellular/network connectivity). The data van or edge computer 118 may also provide access to the data by business communications software, functional analysis software, real-time monitoring and simulation software, testing labs, and hardware to run processes associated with each of these software applications. In an example, the data received by the data van or edge computer 118 can be analyzed either on location using AI models, or the data can be transmitted to a central data processing location or cloud computing service 120 for remote analysis.

The data van or edge computer 118 may use an integrated control system that links all equipment on site within the oil and gas field 100. The data van or edge computer 118 may also include shore-based and onboard power access. The data van or edge computer 118 may house flash memory based storage blades for sensor data storage and high performance computing (HPC) class blades for running edge analytics. Both the storage and server blades can be housed in the same chassis along with networking components. The data van or edge computer 118 may also be 4G/LTE enabled to communicate with the drones 112 and perform peer-to-peer communication for sensor data download and model upload.

A fleet of the drones 112 (e.g., cost-efficient unmanned aerial vehicles (UAVs) or unmanned ground vehicles (UGVs)) may be capable of collecting and disseminating data from the sensor trap appliances 110. The drones 112 may collect aggregated data from the sensor trap appliances 110 and also transfer the AI or ML models pre-built on the data van or edge computer 118, or any other edge or cloud computing system, for anomaly detection at the data source by the sensor trap appliance 110 (e.g., as described in FIG. 9 below). The drones 112 may carry an add-on cellular Internet-of-Things (IoT), Hardware Attached on Top (HAT) device that has combined 4G/LTE technologies for communication with the sensor trap appliances 110. The data and models may be transferred using peer-to-peer communication protocols with end-to-end security between the drones 112 and the sensor trap appliances 110.

The drones 112, by way of example, may include an aircraft with a range of 60 km or greater. The drones 112 may also be capable of landing on a remote site in the oil and gas field 100 and returning to the data van or edge computer 118 within 60 minutes. Additionally, the drones 112 may be capable of landing in an area of the oil and gas field 100 (e.g., near one or more of the wells 102) that is cluttered with equipment and does not provide access to low, glide-scope landings, which may require a 10 m landing radius. The drones may be capable of vertical takeoff and landing, and the drones 112 may be capable of maintaining a continuous communications link between the drones 112 and a base (e.g., the data van or edge computer 118). Further, the drones 112 may stay within a preset geo-fence at all times, and the drones 112 may operate autonomously (i.e., without an external operator influencing the flight path). In an example, the drones 112 may be capable of performing data collection and dissemination through file transfer enabled by a peer-to-peer connection with both the sensor trap appliances 110 and the data van or edge computer 118. Moreover, the drones 112 may be capable of performing AI model dissemination at the sensor trap appliances 110. The drones 112 may also trigger the execution of predictive algorithms used for maintenance at the data vans or edge computers 118 through file transfers between the drones 112 and the data vans or edge computers 118 enabled by peer-to-peer connection.

A microservice-based architecture can be used in the data van or edge computer 118. The microservice-based architecture may enable business process management (BPM)-based workflows to be adaptable because there may be a loose linking between a business process and an execution of individual activities. The microservice-based architecture can be cloud-native and may provide greater flexibility over a strongly-coupled architecture. An example of the microservice-based architecture is described below with respect to FIG. 7.

Figure 2:
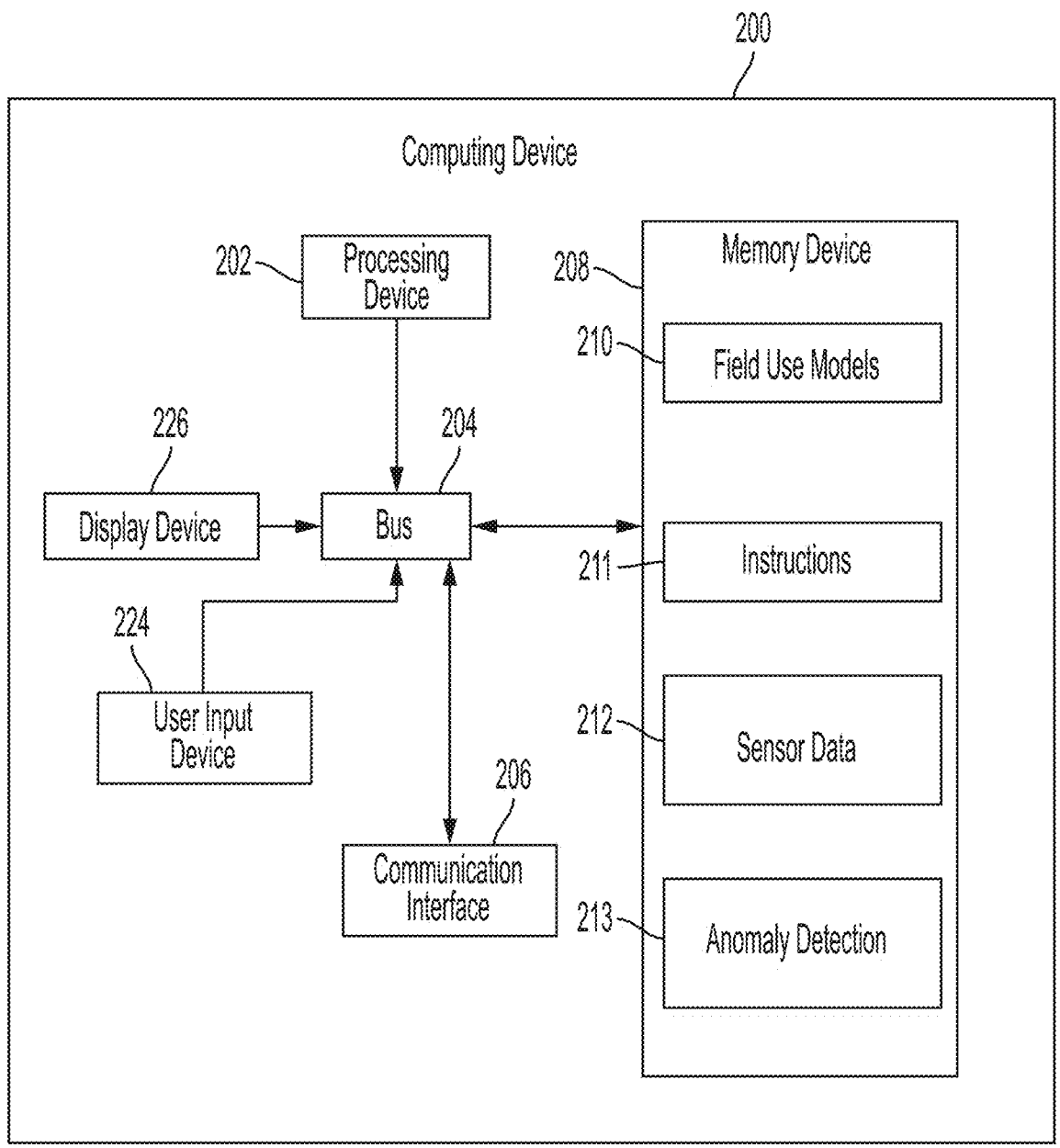
FIG. 2 depicts an example of a computing device to provide control, oversight, or microservice functions for an autonomous operating system for the oil and gas field of FIG. 1 according to some examples of the present disclosure.

FIG. 2 depicts an example of a computing device 200 according to some examples of the present disclosure. The computing device 200 can include a processing device 202, a bus 204, a communication interface 206, a non-transitory or non-volatile memory device 208, a user input device 224, and a display device 226. In some examples, some or all of the components shown in FIG. 2 can be integrated into a single structure, such as a single housing. In other examples, some or all of the components shown in FIG. 2 can be distributed (e.g., in separate housings) and in communication with each other. The computing device 200 may be a node in a cloud computing network that provides control, oversight, or microservice functions for an autonomous operating system for oil and gas fields. The computing device 200 may also be an edge computing node, which can be deployed in various places, including an edge computing van 118.

The processing device 202 can execute one or more operations for providing control and management functions for oil and gas fields. The processing device 202 can execute instructions 211 stored in the memory device 208 that are executable by the processing device 202 to perform the operations. The processing device 202 can include one processing device or multiple processing devices. Non-limiting examples of the processing device 202 include a Field-Programmable Gate Array ("FPGA"), an application-specific integrated circuit ("ASIC"), a microprocessing device, etc.

The processing device 202 can be communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory medium from which the processing device 202 can read instructions. A non-transitory computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the memory device 208 can include field use models 210. In some examples, the computer program instructions 211 are executed by the processing device 202 to enable the processor to perform control and management functions for oil and gas fields. The processing device 202 can determine the most appropriate models to use for detecting events (i.e., anomalies) that require attention or action. The memory device 208 can also include sensor data 212 and an anomaly detection model 213 to determine anomalies in the data.

In some examples, the computing device 200 includes a communication interface 206. The communication interface 206 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the computing device 200 includes a user input device 224. The user input device 224 can represent one or more components used to input data. Examples of the user input device 224 can include a keyboard, mouse, touchpad, button, touch-screen display, etc.

In some examples, the computing device 200 includes a display device 226, which can display warnings associated with events that require attention or action, as discussed above, as well as information about training data sets and test point data. The display device 226 can represent one or more components used to output data. Examples of the display device 226 can include a liquid-crystal display (LCD), a computer monitor, a touch-screen display, etc. In some examples, the user input device 224 and the display device 226 can be a single device, such as a touch-screen display.

Figure 3:
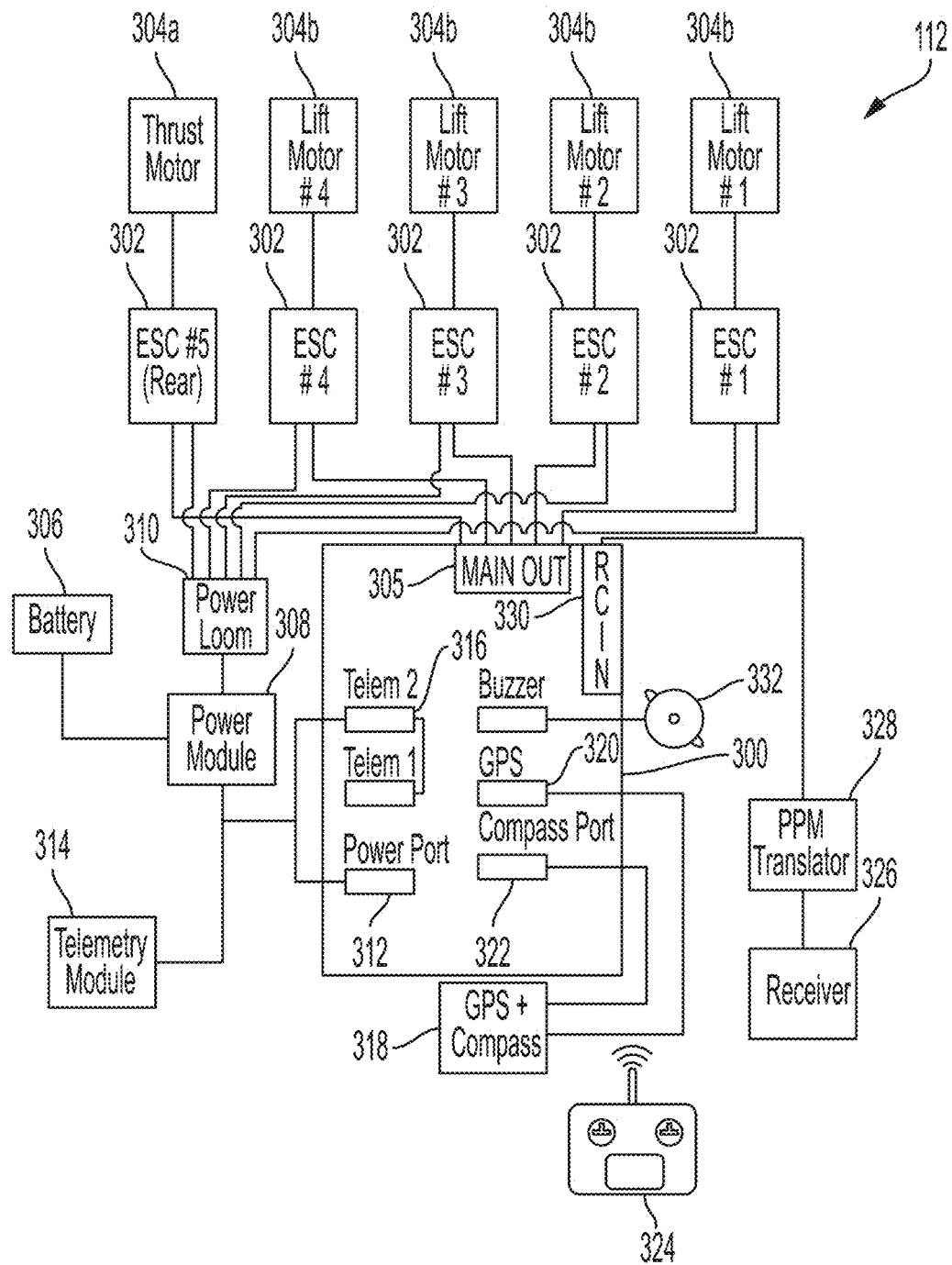
FIG. 3 is a schematic view of a flight control module and peripheral components of a drone according to some examples of the present disclosure.

FIG. 3 is a schematic view of a flight control module 300 and peripheral components of the drone 112 according to some examples of the present disclosure. As illustrated, the drone 112 includes five electronic speed controllers (ESCs) 302 associated with five motors 304. One of the motors 304a may be used for controlling forward thrust for the drone 112, while the remaining motors 304b may be used for controlling lift. More or fewer ESCs 302 and motors 304 may be used to operate the drone 112. Further, the flight control module 300 may provide control signals to the ESCs 302 from a main output 305 of the flight control module 300 for controlling the speed of the individual motors 304.

In an example, the drone 112 may be battery powered with an onboard battery 306, such as a lithium polymer battery. Power from the battery 306 may be distributed to a power module 308 that is able to distribute power to (i) a power loom 310 for powering the ESCs 302 and the motors 305 and (ii) a power port 312 of the flight control module 300 for powering flight control systems. In other examples, the battery 306 may be replaced with an engine powered by a fuel source, such as gasoline. In another example, the drone 112 may be powered by a hybrid gas-electric power system.

A telemetry module 314 may be communicatively coupled to a telemetry port 316 of the flight control module 300. The telemetry module 314 may provide a secondary means of controlling the drone 112. The telemetry module 314 may also provide a mechanism for communicating with the sensor trap appliances 110 when the drone 112 is within communication range of the sensor trap appliances 110 and communicating with the data processing center 114 when the drone 112 is within range of the data processing center 114.

In an example, the drone 112 may include a global positioning system (GPS) and compass 318 coupled to a GPS port 320 and a compass port 322 of the flight control module. The GPS and compass 318 may keep track of the location of the drone 112. Additionally, the GPS and compass 318 may enable location control of the drone 112 for flights between the wells 102 and to maintain the drone 112 within geofenced boundaries assigned to the oil and gas field 100.

A transmitter 324 may provide an operator of the drone 112 with a communication link to the drone 112. Signals from the transmitter 324 may be received at a receiver 326 coupled to a pulse position modulation (PPM) translator 328. The receiver 326 may receive 24 GHz signals from the transmitter 324 to provide the operator with low latency control over the drone 112. The signals received at the receiver 326 may be converted from pulse width modulation (PWM) signals to PPM signals that are readable by the flight control module 300. The PPM signals may be provided to a receiver input port 330, and the PPM signals are used to control various aspects of the drone 112 when the drone 112 is operated manually.

A buzzer 332 may also be included on the drone 112. The buzzer 332 may provide audio signals that indicate various operations being performed by the flight control module 300. For example, the buzzer 332 may provide audio signals that indicate an error or that indicate completion of a startup procedure.

Figure 4:
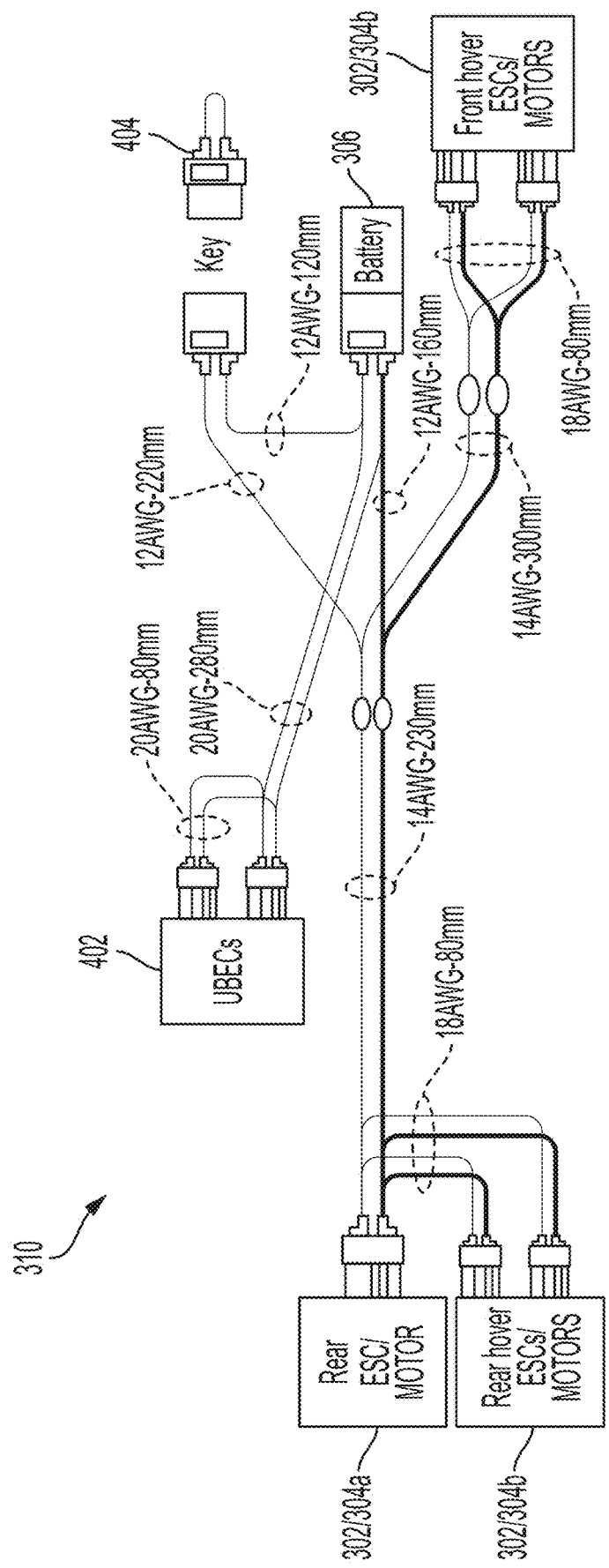
FIG. 4 is a schematic diagram of a power loom that distributes power from a battery to peripherals of a drone according to some examples of the present disclosure.

FIG. 4 is a schematic diagram of the power loom 310 that distributes power from the battery 306 to peripherals of the drone 112 according to some examples of the present disclosure. In an example, the power loom 310 may distribute power from the battery 306 to the ESCs 302 to control the motors 304 associated with the ESCs 302. The power loom 310 may also provide power from the battery 306 to two universal battery eliminator circuits 402, which ultimately lead to the flight control module 300 to power other components electrically coupled to the battery 306 through the flight control module 300. The power loom 310 may reduce wiring of the drone 112, as well as the use of excess power connectors. Additionally, by soldering the ESCs 302 and the universal battery eliminator circuits 402 to external connectors (e.g., male or female connectors), the ESCs 302 and the universal battery eliminator circuits 402 can be easily detached from the power loom 310. This may ease replacement of parts of the drone 112 and provide enhanced diagnostic capability.

An XT60 key 404, when detached, may result in disabling the propulsion system. With the XT60 key 404 removed, the universal battery eliminator circuits 402 and the flight control module 300 may remain in a powered-on state. In another example, the whole system can be disabled by removing the connection to the battery 306.

Figure 5:
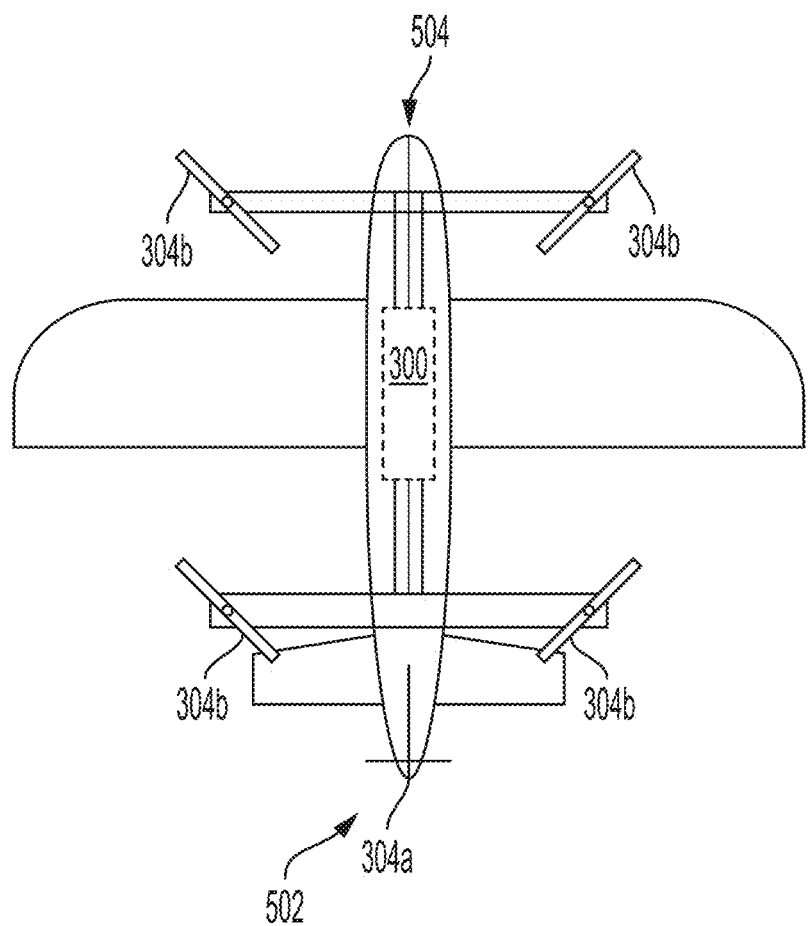
FIG. 5 is an example of a drone as an unmanned aerial vehicle (UAV) according to some examples of the present disclosure.

FIG. 5 is an example of the drone 112 as an unmanned aerial vehicle (UAV) according to some examples of the present disclosure. The flight control module 300 may be disposed along a body of the drone 112. Further, the lift motors 304*b* may be positioned at four locations to provide lift to the drone 112, and the thrust motor 304*a* may be positioned at a rear end 502 of the drone 112 to provide thrust. In some examples, the thrust motor 304*a* may be located at a front end 504 of the drone 112. Further, more or fewer motors 304 may also be used to control the lift or the thrust of the drone 112.

Figure 6:
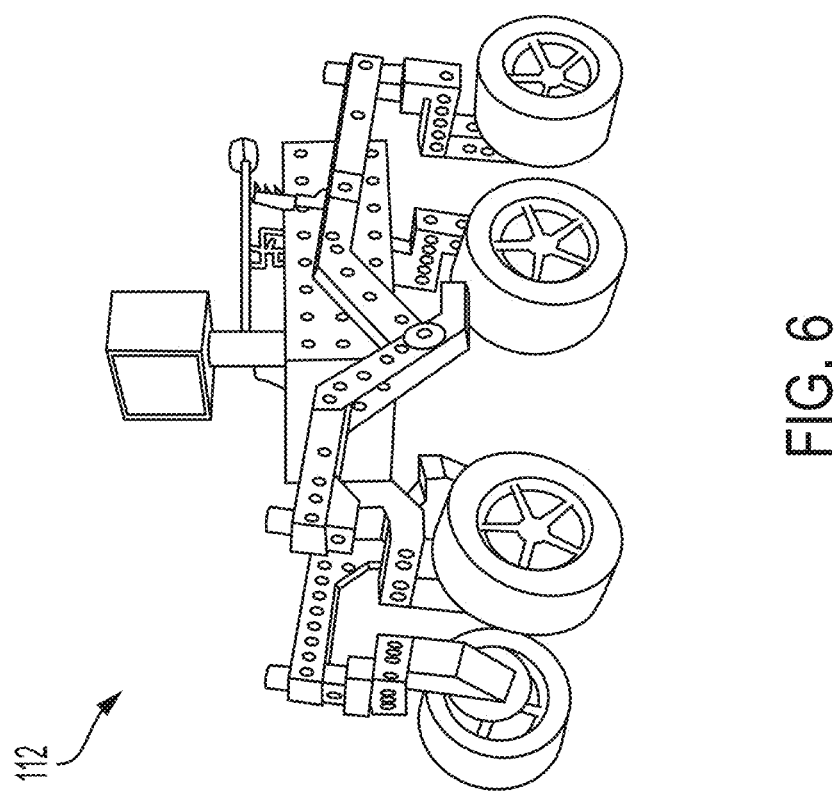
FIG. 6 is an example of the drone 112 as an unmanned ground vehicle (UGV) according to some examples of the present disclosure.

FIG. 6 is an example of the drone 112 as an unmanned ground vehicle (UGV) according to some examples of the present disclosure. The drone 112 may include a rocker-bogie suspension system that enables all 6 wheels to continually be in contact with the ground while climbing over obstacles. A differential pivot of the drone 112 may enable weight to be mechanically offloaded from one side of the rover to the other while climbing over uneven terrain. Additionally, the drone 112 may include a six-wheel Ackerman steering system that governs where the wheels point and how fast each of the wheels will move. A computing device, such as a Raspberry Pi, can be used as the "brain" of the drone 112. The computing device may be selected for versatility, accessibility, simplicity, and ability to add and upgrade modifications. Any method of communication supported by a the computing device (e.g., Bluetooth, Wi-Fi, USB devices, etc.) can interface with the control system of the drone 112. In an example, the drone 112 may be operated autonomously from the camera, using a USB dongle attached to any input device (e.g., a video game controller, a USB microphone, etc.), or through any interface using the computing device's general-purpose input/output (GPIO) ports (e.g., distance sensors, accelerometers, etc.).

Figure 7:
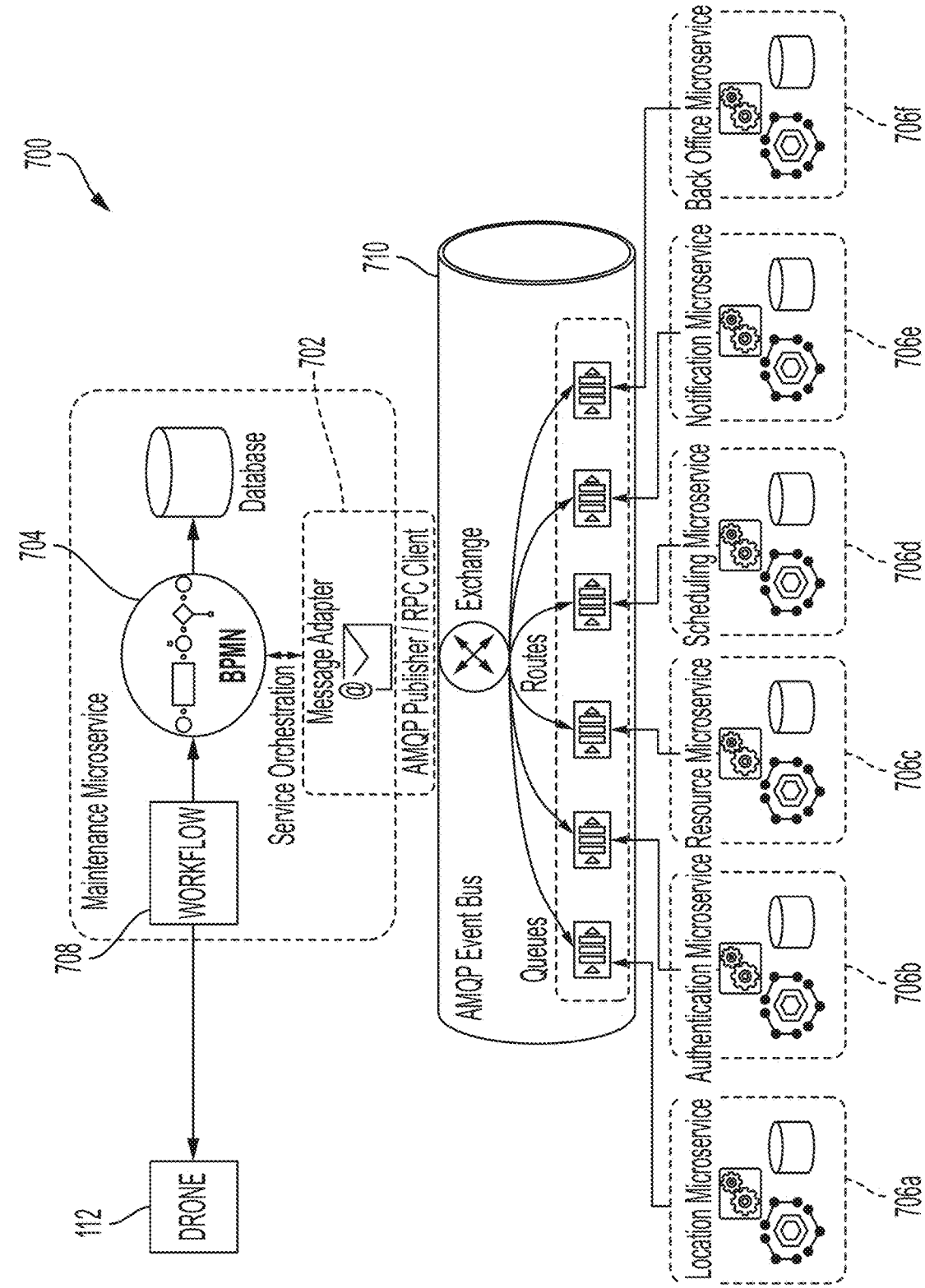
FIG. 7 is a schematic diagram of a microservice-based architecture that may be used in coordination with data received from the drones according to some examples of the present disclosure.

FIG. 7 is a schematic diagram of a microservice-based architecture 700 that may be used in coordination with data received from the drones 112 according to some examples of the present disclosure. To decouple services from a business process, promote reusability, and eliminate the process of creating service adapters for every service, a messaging service 702 can be used as an intermediary between a business processing management (BPM) engine 704 and individual microservices 706. The BPM engine 704 may read a workflow 708 and determine which microservices 706 should be executed, and the messaging service 702 may direct the instructions to the correct microservice 706. For example, the messaging service may direct the instructions to the correct microservice 706 through an advanced message queuing protocol (AMQP) bus 710.

The microservice-based architecture 700 can be used to automate the process of scheduling and performing maintenance. In an example, the microservice-based architecture 700 may be event-driven, which indicates that the business process is started by the occurrence of an event and that the operations in the business process are started only once previous steps are complete. The starting event may be the detection of an anomaly at the well 102 as provided by data recovered by the drone 112 from the sensor trap appliances 110 within the oil and gas field 100. Upon detection of the anomaly, the anomaly may be located (e.g., a particular well 102 may be identified) using the location microservice 706*a*, a user may be authenticated using the authentication microservice 706*b*, parts may be identified and ordered using the resource microservice 706*c*, maintenance services may be scheduled using the scheduling microservice 706*d*, scheduling notifications may be provided to a maintenance team using the notification microservice 706*e*, and approval may be requested from a supervisor using the back office microservice 706*f*. These steps may all be automated using the microservice-based architecture 700. Since the process is event-driven, if one of the operations fails, another business process can be started to address the error.

Figure 8:
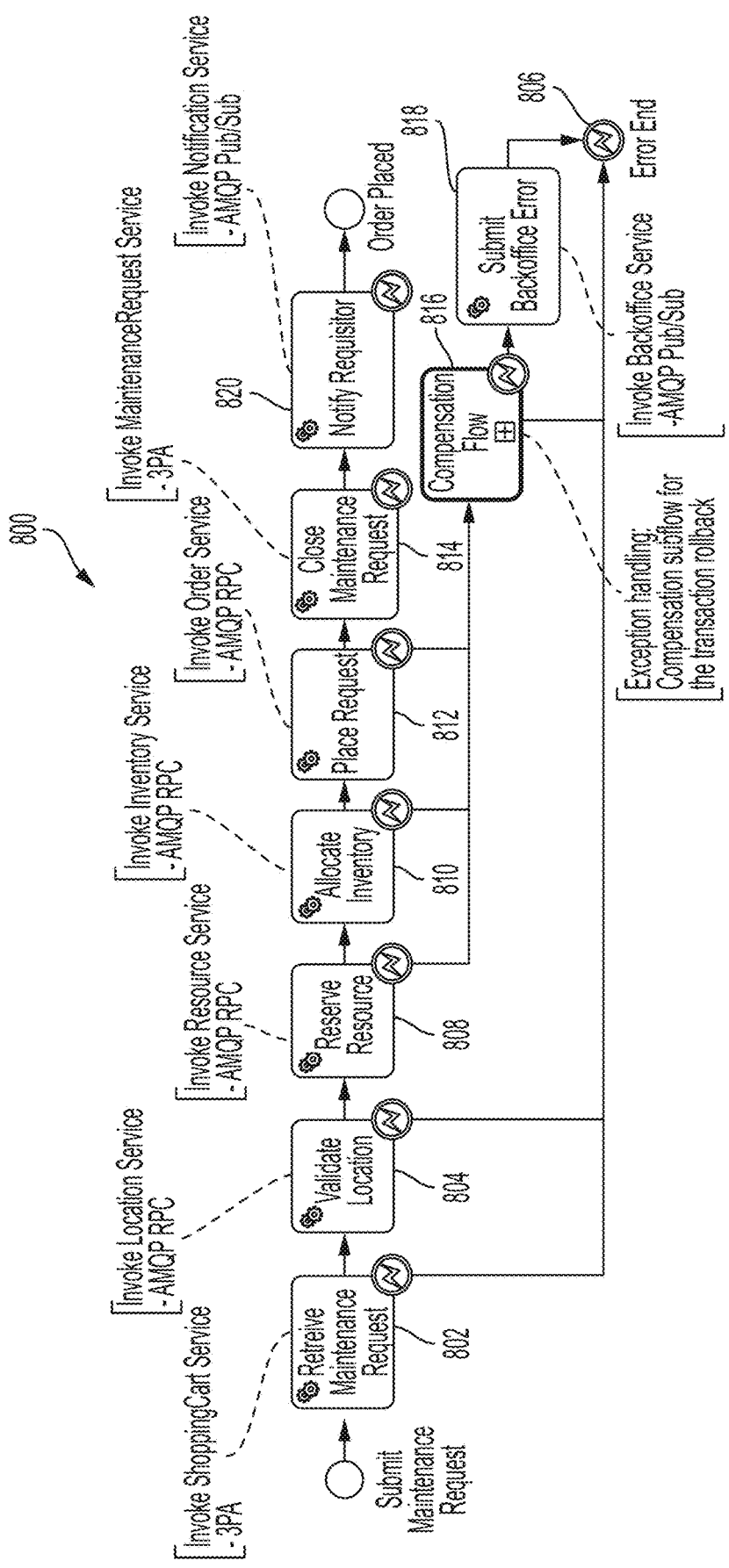
FIG. 8 is a diagram of an automated business process using the microservice-based architecture according to some examples of the present disclosure.

FIG. 8 is a diagram of an automated business process 800 using the microservice-based architecture 700 according to some examples of the present disclosure. At block 802, a maintenance request is retrieved by the BPM engine 704. The maintenance request may be retrieved by the BPM engine 704 in response to detection of an anomaly at a well 102 by the drone 112. In an example, the maintenance request may be generated by a microservice 706, such as a shopping cart microservice. At block 804, the location microservice 706*a* may be accessed by the BPM engine 704 to validate a location associated with the maintenance request. If errors 806 are detected at either blocks 802 or 804, the errors 806 may be assessed at the BPM engine 704 to initiate processes that are capable of addressing the errors 806.

At block 808, the BPM engine 704 may access the resource microservice 706*c* to reserve a resource (e.g., a part) associated with the maintenance request. At block 810, the BPM engine 704 may request that the resource be allocated to inventory by a microservice 706, such as an inventory microservice. Further, at block 812, the BPM engine 704 may request that an order for the resource be placed by a microservice 706, such as an order microservice. Additionally, at block 814, the BPM engine 704 may request that the maintenance request be closed by a microservice 706, such as a maintenance request microservice. A compensation flow for the resource may be completed at block 816, and any back office errors 818 associated with obtaining the resource may be reported to the BPM engine 704 as part of the errors 806 that are provided to the BPM engine 704 for assessment. The BPM 704 may initiate a process that is capable of addressing the error upon completion of the error assessment. At block 820, the notification microservice 706*e* may notify a requestor of the ordered resource.

Figure 9:
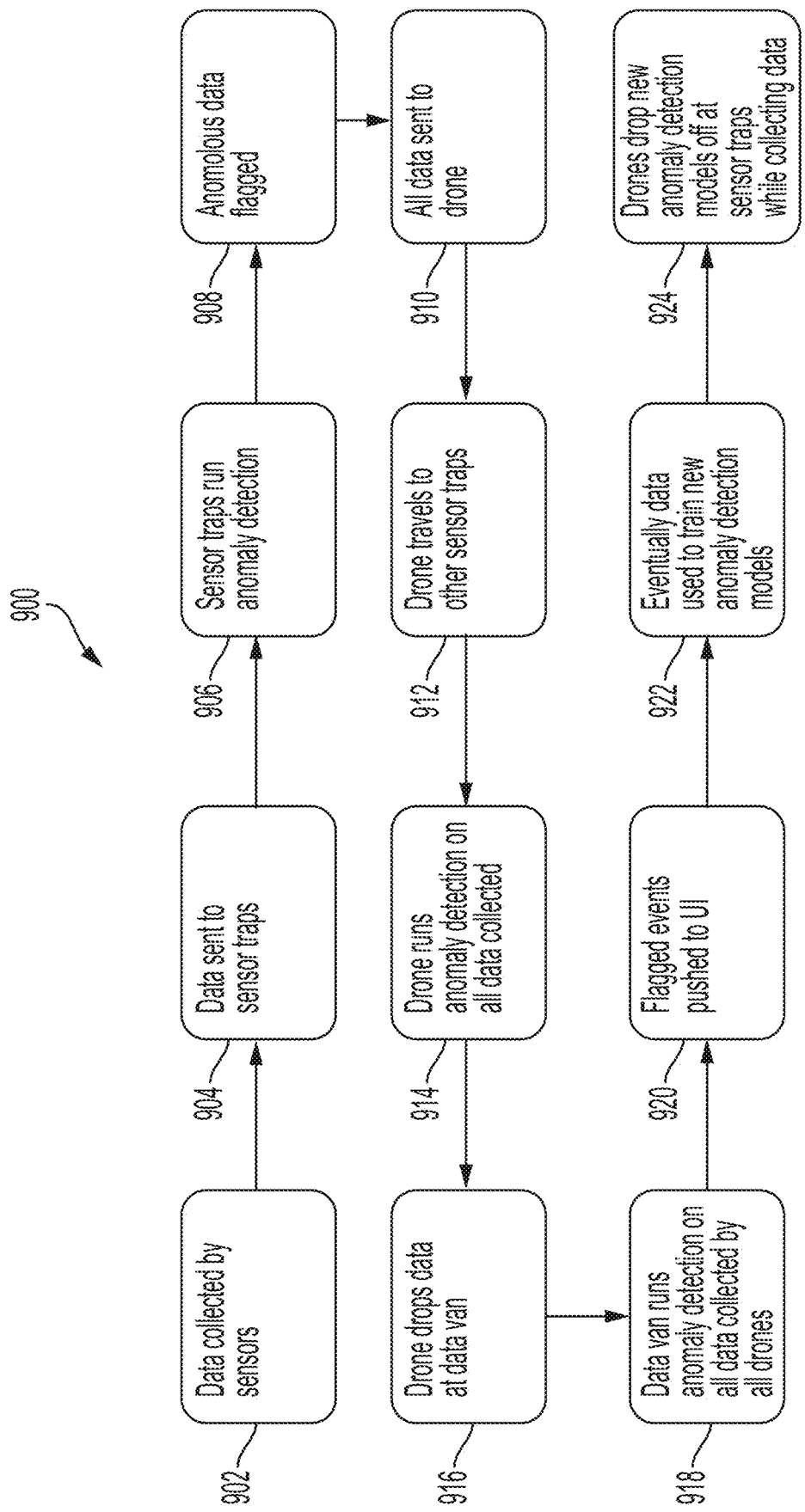
FIG. 9 is a flowchart of a process for anomaly detection in the oil and gas field of FIG. 1 according to some examples of the present disclosure.

FIG. 9 is a flowchart of a process 900 for anomaly detection in the oil and gas field 100 according to some examples of the present disclosure. At block 902, the process 900 involves collecting data at the wells 102 using the well sensors 104. The well sensors 104 may be any sensor positioned at the well 102 or within wellbores associated with the wells 102.

At block 904, the process 900 involves sending the data from the wells 102 to the sensor trap appliances 110. In an example, the wireless gateways 108 may receive the data from the wells 102 and transmit the data to the sensor trap appliances 110. Each of the wells 102 may be associated with an individual sensor trap appliance 110.

At block 906, the process 900 involves running an anomaly detection model on the data at the sensor trap appliances 110. The anomaly detection model may identify anomalies present at the wells 102, and the anomalies may indicate that maintenance should be performed at the wells 102 associated with the anomalies. An AI-based anomaly detection engine can be used to detect the anomalies that start the BPM process. In an example, a Gaussian process regression (GPR) based workflow may be used in the AI-based anomaly detection engine to enable simultaneous performance of real-time modeling of uncertainty and prediction of the anomaly. In some examples, the anomaly detection model may be tuned for specific types of the sensors 104 that originate the data from the well 102. For example, anomaly detection on processes on data recovered at a particular sensor trap appliance 110 originating from a particular set of sensors 104 may rely on a different anomaly detection model than anomaly detection processes on data from another well 102 that includes different types of sensors 104.

At block 908, the process 900 involves flagging the anomalous data detected by the anomaly detection model. At block 910, the process 900 involves collecting the data at the sensor trap appliance 110 by the drone 112. As discussed above, the drone 112 may collect the data from the sensor trap appliance 110 using a secure peer-to-peer (P2P) wireless data transfer.

At block 912, the process 900 involves the drone 112 collecting data from several additional sensor trap appliances 110 in the oil and gas field 100. In some examples, at block 914, the process 900 involves the drone 112 running an anomaly detection model on all of the data collected from all of the sensor trap appliances 110. The drone 112 may run a different version of the anomaly detection model than the anomaly detection models implemented at the sensor trap appliances 110. For example, the anomaly detection model performed by the drone 112 may be tuned for each different type of sensor 104 associated with the different sensor trap appliances 110 from which the drone 112 collects data. The drone 112 may also flag the anomalous data detected by the anomaly detection model.

At block 916, the process 900 involves the drone 112 transferring all of the data to the data van or edge computer 118. The data van or edge computer 118 may aggregate data collected by multiple drones. Further, at block 918, the process 900 involves the data van or edge computer 118 running a third version of the anomaly detection model to confirm that the flagged events are anomalies. At block 920, the process 900 involves pushing the flagged events to a user interface so that the identified anomalies can be addressed.

After sufficient data has been collected by the data van or edge computer 118, at block 922, the process 900 involves training new anomaly detection models (e.g., AI or ML models) using the data collected from the sensor trap appliances 110. At block 924, the drones 112 provide the new anomaly detection models to the sensor trap appliances 110 while collecting sensor data from the sensor trap appliances 110. In this manner, the anomaly detection models may be improved as more data is collected.

Figure 10:
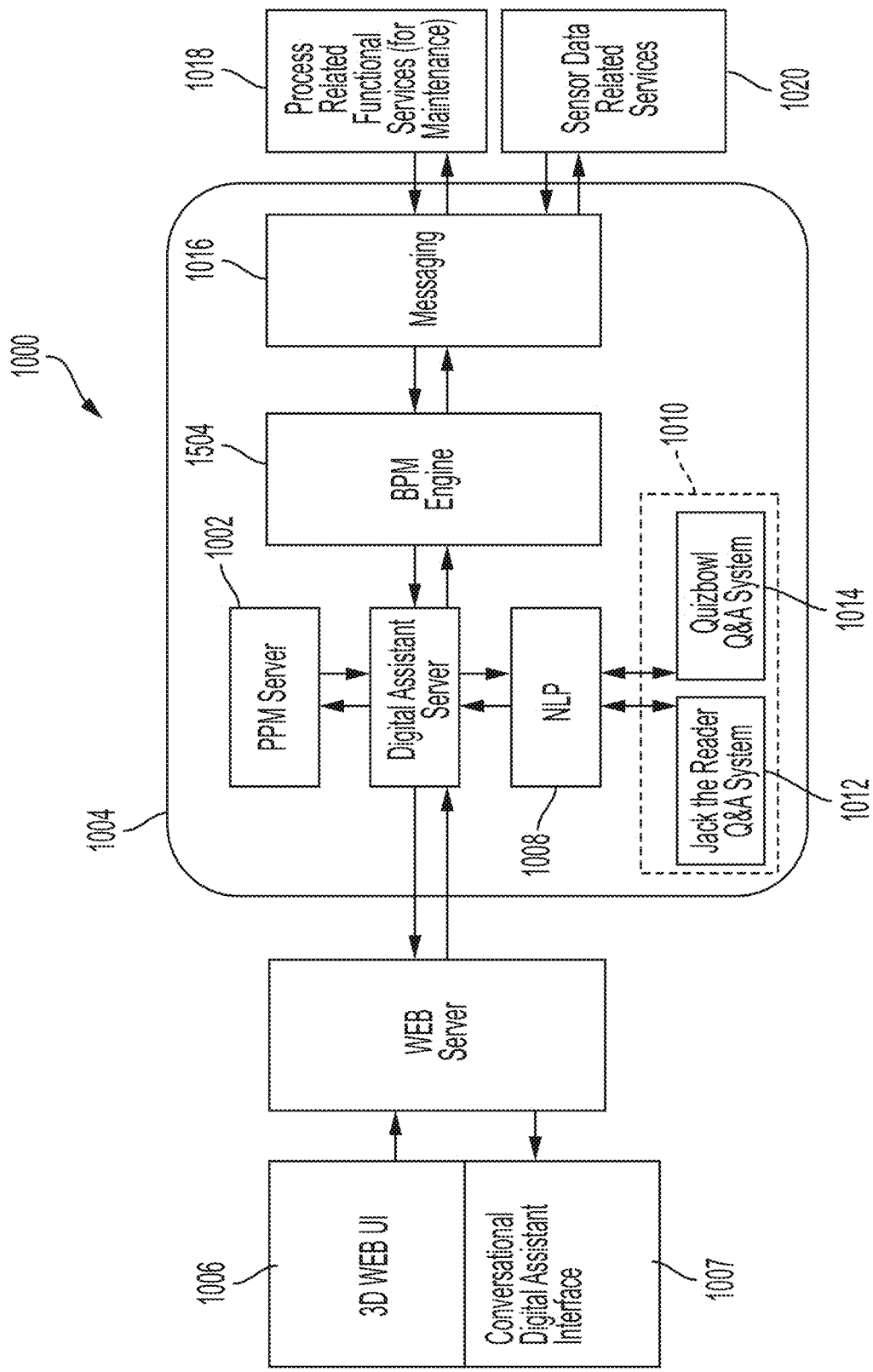
FIG. 10 is a schematic view of a system implementing predictive process modeling according to some examples of the present disclosure.

FIG. 10 is a schematic view of a system 1000 implementing predictive process modeling according to some examples of the present disclosure. In an example, predictive process modeling can be used to predict the success of a process given the differing states of the previous steps in the process. The predictive process modeling in at least some examples uses the current state of the process to output three results: (1) a binary case outcome based on an expected case duration; (2) a remaining cycle time; and (3) a subsequent activity to be executed.

The predictive process modeling code of the system 1000 (e.g., as run on the predictive process modeling server 1002) may use a graph-based, long short-term memory (LSTM) architecture. In addition, the predictive process modeling code may be bundled with the BPM engine 704, and the predictive process modeling server 1002 may process input alongside the BPM engine 704. Processing the input alongside the BPM engine 704 may enable real-time analysis of the state of the process beyond the current operation of the wells 102. The predictive process modeling code may enable a user to change a business process from a static model to an adaptive model. For example, the predictive process modeling code enables operating conditions to influence progression of the process in real time.

In some examples, an application 1004 may shift a paradigm of interaction away from touch. An application according to the examples presented herein may use voice commands received at a conversational digital assistant interface 1007 for user interaction with the process. By relying on voice commands, the application 1004 can be made more suitable for field personnel who may not always have an extra hand free to grasp or use a touch reliant device (e.g., a touchscreen of a computing device). Voice commands can be used to navigate between different screens on a user interface (UI) 1006, fill in fields, query the system and schedule maintenance. The voice input can be processed by a natural language processing (NLP) unit 1008 that is trained to understand the domain-specific vocabulary of maintenance personnel instead of the domain-neutral vocabulary used in everyday speech.

The application 1004 can use a question-answering module 1010 to answer questions about a current situation. While breaking down questions is easy for a human, understanding of context of a question may be particularly difficult for computers, especially when it comes to human language. An example question might be, "How big is the heat exchanger used to cool the equipment at this well?" The NLP unit 1008 can understand context properly and answer the question using one of two question-answering frameworks 1012 or 1014 of the question-answering module 1010, depending on the subject matter of the question. The unit can also retrieve answers from the predictive process modeling server 1002 when asked to make predictions about the current state of a process. A messaging unit 1016 of the application 1004 may provide access to process related functional services 1018 and sensor data related services 1020 in response to voice commands received at the conversational digital assistant interface 1007.

In some aspects, systems, devices, and methods for autonomous monitoring and control of oil and gas fields are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: at least one autonomous vehicle; a processor communicatively couplable to the at least one autonomous vehicle; and a non-transitory memory device comprising instructions that are executable by the processor to cause the processor to perform operations comprising: receiving field analytics data of an oil and gas field; producing at least one hydrocarbon field model based on the field analytics data; deploying the at least one hydrocarbon field model to a sensor trap appliance using the at least one autonomous vehicle; receiving well sensor data from the sensor trap appliance; detecting an anomaly using the at least one hydrocarbon field model and the well sensor data; and triggering an operational process based on detecting the anomaly.

Example 2 is the system of example 1, wherein the at least one autonomous vehicle comprises at least one unmanned ground vehicle or at least one unmanned aerial vehicle.

Example 3 is the system of examples 1-2, wherein the operational process includes at least one of a maintenance operation, a product delivery operation, or a production optimization process.

Example 4 is the system of examples 1-3, wherein receiving the well sensor data from the sensor trap appliance is performed using a wireless peer-to-peer data transfer.

Example 5 is the system of examples 1-4, wherein triggering the operational process comprises transmitting information associated with the anomaly to a business process management (BPM) engine that controls the operational process.

Example 6 is the system of examples 1-5, wherein detecting the anomaly comprises inputting the hydrocarbon field model and the well sensor data to a deep-learning-based anomaly detection engine.

Example 7 is the system of examples 1-6, wherein detecting the anomaly comprises detecting an equipment anomaly, a low production well, an abnormal operational condition, or any combination thereof.

Example 8 is the system of examples 1-7, wherein triggering the operational process comprises providing information about the anomaly to a voice-driven user-interface.

Example 9 is a method comprising: collecting, by an autonomous vehicle, well sensor data from a plurality of sensor trap appliances located at a plurality of wells in an oil and gas field; detecting and flagging, using an anomaly detection model and the well sensor data at the autonomous vehicle, at least one anomaly of the well sensor data; and providing flagged anomaly information and the well sensor data to an edge computing device located remote from the plurality of sensor trap appliances to trigger an operational process using the flagged anomaly information.

Example 10 is the method of example 9, wherein the autonomous vehicle comprises an unmanned aerial vehicle or an unmanned ground vehicle.

Example 11 is the method of examples 9-10, wherein the operational process includes at least one of a maintenance operation, a product delivery operation, or a production optimization process.

Example 12 is the method of examples 9-11, further comprising: receiving, at the autonomous vehicle, at least one hydrocarbon field model generated using the well sensor data; and delivering, by the autonomous vehicle, the at least one hydrocarbon field model to the plurality of sensor trap appliances.

Example 13 is the method of examples 9-12, wherein collecting the well sensor data from the plurality of sensor trap appliances and providing the flagged anomaly information to the edge computing device are each performed wirelessly using wireless peer-to-peer data transfers.

Example 14 is the method of examples 9-13, wherein detecting the at least one anomaly comprises detecting an equipment anomaly, a low production well, an abnormal operational condition, or any combination thereof.

Example 15 is the method of examples 9-14, wherein the anomaly detection model comprises a Gaussian process regression (GPR) based workflow.

Example 16 is a non-transitory computer-readable medium comprising program code that is executable by a processing device for causing the processing device to: collect well sensor data at an autonomous vehicle from a plurality of sensor trap appliances located at a plurality of wells in an oil and gas field; detect and flag anomalies of the well sensor data; and transmit the flagged anomalies and the well sensor data to an edge computing device located remote from the plurality of sensor trap appliances to trigger an operational process based on the flagged anomalies.

Example 17 is the non-transitory computer-readable medium of example 16, wherein collecting the well sensor data and transmitting the flagged anomalies are each performed wirelessly using wireless peer-to-peer data transfers.

Example 18 is the non-transitory computer-readable medium of examples 16-17, further causing the processing device to: control the autonomous vehicle to travel to the plurality of sensor trap appliances, wherein the autonomous vehicle is an unmanned aerial vehicle or an unmanned ground vehicle.

Example 19 is the non-transitory computer-readable medium of example 18, further causing the processing device to: receive at least one hydrocarbon field model from the edge computing device, wherein the hydrocarbon field model is generated using the well sensor data; and control the autonomous vehicle to transmit the at least one hydrocarbon field model to the plurality of sensor trap appliances.

Example 20 is the non-transitory computer-readable medium of examples 16-19, wherein the operational process includes at least one of a maintenance operation, a product delivery operation, or a production optimization process.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   at least one autonomous vehicle configured to perform operations including traversing at least a portion of an oil and gas field containing one or more wells;
   a wireless gateway positionable within the oil and gas field and configured to wirelessly receive sensor data from the one or more wells;
   a sensor trap appliance positionable within the oil and gas field and configured to collect the sensor data from the wireless gateway, aggregate the sensor data, and wirelessly transmit the aggregated sensor data to the at least one autonomous vehicle;
   an edge computing system locatable at the oil and gas field, the edge computing system including a processor communicatively couplable to the at least one autonomous vehicle and a non-transitory memory device comprising instructions that are executable by the processor to cause the processor to perform operations comprising:
      receiving the aggregated sensor data from the at least one autonomous vehicle;
      producing at least one hydrocarbon field model based on the aggregated sensor data, the at least one hydrocarbon field model including an anomaly detection model;
      deploying the anomaly detection model to the sensor trap appliance using the at least one autonomous vehicle;
      determining an anomaly exists at the one or more wells by running the anomaly detection model on the aggregated sensor data; and
      in response to determining an anomaly exists at the one or more wells, triggering an operational process.

2. The system of claim 1, wherein the at least one autonomous vehicle comprises at least one unmanned ground vehicle or at least one unmanned aerial vehicle.

3. The system of claim 1, wherein the operational process includes at least one of a maintenance operation, a product delivery operation, or a production optimization process.

4. The system of claim 1, wherein:
the sensor trap appliance is further configured to run a first version of the anomaly detection model on the aggregated sensor data at the sensor trap appliance to detect an anomaly present at the one or more wells;
the at least one autonomous vehicle is further configured to run a second version of the anomaly detection model on the aggregated sensor data at the at least one autonomous vehicle to detect an anomaly present at the one or more wells, the second anomaly detection model being different then the first anomaly detection model;
the anomaly detection model associated with the edge computing system is a third version of the anomaly detection model, which is different than the first version of the anomaly detection model and the second version of the anomaly detection model; and
the determining, by the edge computing device processor that an anomaly exists at the one or more wells, includes confirming by the edge computing device processor, by running the third version of the anomaly detection model, that an anomaly detected by the sensor trap appliance or by the at least one autonomous vehicle, is an actual anomaly.

5. The system of claim 1, wherein triggering the operational process comprises transmitting information associated with the anomaly to a business process management (BPM) engine that controls the operational process.

6. The system of claim 4, wherein the second version of the anomaly detection model associated with the at least one autonomous vehicle is tuned for each different type of sensor utilized by the sensor trap appliance.

7. The system of claim 1, wherein the anomaly is an equipment anomaly, a low production well, an abnormal operational condition, or any combination thereof.

8. The system of claim 1, wherein triggering the operational process comprises providing information about the anomaly to a voice-driven user-interface.

9. A method comprising:
traversing, by an autonomous vehicle, at least a portion of an oil and gas field containing one or more wells;
receiving, by a wireless gateway positioned within the oil and gas field, sensor data from the one or more wells;
collecting, by a plurality of sensor trap appliances positioned within the oil and gas field, the sensor data from the wireless gateway;
aggregating the sensor data at the plurality of sensor trap appliances;
wirelessly transmitting, by the plurality of sensor trap appliances, the aggregated sensor data to the autonomous vehicle;
receiving, by a processor of an edge computing system located at the oil and gas field, the aggregated sensor data from the autonomous vehicle;
generating, by the processor, at least one hydrocarbon field model based on the aggregated sensor data, the at least one hydrocarbon field model including an anomaly detection model;
deploying the anomaly detection model to the plurality of sensor trap appliances using the autonomous vehicle;
determining, by the processor, that an anomaly exists at the one or more wells by running the anomaly detection model on the aggregated sensor data; and
in response to determining that an anomaly exists at the one or more wells, triggering an operational process.

10. The method of claim 9, wherein the autonomous vehicle comprises an unmanned aerial vehicle or an unmanned ground vehicle.

11. The method of claim 9, wherein the operational process includes at least one of a maintenance operation, a product delivery operation, or a production optimization process.

12. The method of claim 9, further comprising:
running a first version of the anomaly detection model on the aggregated sensor data at the sensor trap appliance to detect an anomaly present at the one or more wells;
running a second version of the anomaly detection model at the autonomous vehicle on the aggregated sensor data transmitted by the plurality of sensor trap appliances to detect an anomaly present at the one or more wells, the second anomaly detection model being different then the first anomaly detection model;
running, by the processor of the edge computing system, a third version of the anomaly detection model on the aggregated sensor data received by the edge computing system, the third version of the anomaly detection model being different then the first version of the anomaly detection model and the second version of the anomaly detection model; and
determining, by the processor, that an anomaly exists at the one or more wells by confirming, by running the third version of the anomaly detection model, that an anomaly detected by one or more of the plurality of sensor trap appliances or by the autonomous vehicle is an actual anomaly.

13. The method of claim 12, wherein the second version of the anomaly detection model associated with the autonomous vehicle is tuned for each different type of sensor utilized by the sensor trap appliance.

14. The method of claim 9, wherein the anomaly is an equipment anomaly, a low production well, an abnormal operational condition, or any combination thereof.

15. The method of claim 9, wherein the anomaly detection model comprises a Gaussian process regression (GPR) based workflow.

16. A non-transitory computer-readable medium comprising program code that is executable by a processing device for causing the processing device to:
receive, by a wireless gateway positionable within an oil and gas field, sensor data from one or more wells of the oil and gas field;
collect, by a plurality of sensor trap appliances positionable within the oil and gas field, the sensor data from the wireless gateway;
aggregate the sensor data at the plurality of sensor trap appliances;
wirelessly transmit, by the plurality of sensor trap appliances, the aggregated sensor data to an autonomous vehicle configured to traverse at least a portion of the oil and gas field;
receive, by an edge computing system locatable at the oil and gas field, the aggregated sensor data from the autonomous vehicle;
produce, by the edge computing system, at least one hydrocarbon field model based on the aggregated sensor data, the at least one hydrocarbon field model including an anomaly detection model;
deploy the anomaly detection model to the plurality of sensor trap appliances using the autonomous vehicle;
determine, by the edge computing system, that an anomaly exists at the one or more wells by running the anomaly detection model on the aggregated sensor data; and
in response to determining that an anomaly exists at the one or more wells, triggering an operational process.

17. The non-transitory computer-readable medium of claim 16, wherein the operations further comprise:
- running, at the plurality of sensor trap appliances, a first version of the anomaly detection model on the aggregated sensor data to detect an anomaly present at the one or more wells;
- running, at the autonomous vehicle, a second version of the anomaly detection model on the aggregated sensor data to detect an anomaly present at the one or more wells, the second anomaly detection model being different then the first anomaly detection model;
- running, at the edge computing device, a third version of the anomaly detection model, the third version of the anomaly detection model being different then the first version of the anomaly detection model and the second version of the anomaly detection model; and
- determining, by the edge computing device, that an anomaly exists at the one or more wells, by confirming by the edge computing device by running the third version of the anomaly detection model, that an anomaly detected by one or more of the plurality of sensor trap appliances or by the autonomous vehicle, is an actual anomaly.

18. The non-transitory computer-readable medium of claim 16,
wherein the autonomous vehicle is an unmanned aerial vehicle or an unmanned ground vehicle.

19. The non-transitory computer-readable medium of claim 17, wherein the second version of the anomaly detection model associated with the autonomous vehicle is tuned for each different type of sensor utilized by the plurality of sensor trap appliances.

20. The non-transitory computer-readable medium of claim 16, wherein the operational process includes at least one of a maintenance operation, a product delivery operation, or a production optimization process.

* * * * *